United States Patent
Matsumoto et al.

(10) Patent No.: US 11,954,241 B2
(45) Date of Patent: Apr. 9, 2024

(54) INFORMATION DISPLAY SYSTEM AND INFORMATION DISPLAY METHOD

(71) Applicant: SHIMIZU CORPORATION, Tokyo (JP)

(72) Inventors: Takashi Matsumoto, Tokyo (JP); Yuya Igarashi, Tokyo (JP); Motoaki Yamazaki, Tokyo (JP); Michihito Shiraishi, Tokyo (JP)

(73) Assignee: SHIMIZU CORPORATION, Tokyo (JP)

( * ) Notice: Subject to any disclaimer, the term of this patent is extended or adjusted under 35 U.S.C. 154(b) by 168 days.

(21) Appl. No.: 17/421,153

(22) PCT Filed: Jan. 6, 2020

(86) PCT No.: PCT/JP2020/000044
§ 371 (c)(1),
(2) Date: Jul. 7, 2021

(87) PCT Pub. No.: WO2020/145232
PCT Pub. Date: Jul. 16, 2020

(65) Prior Publication Data
US 2022/0083127 A1    Mar. 17, 2022

(30) Foreign Application Priority Data
Jan. 8, 2019   (JP) ................................ 2019-001246

(51) Int. Cl.
*G06F 3/01* (2006.01)
*G06K 7/14* (2006.01)
(Continued)

(52) U.S. Cl.
CPC ............ *G06F 3/011* (2013.01); *G06K 7/1413* (2013.01); *G06K 7/1417* (2013.01); *G06T 7/20* (2013.01);
(Continued)

(58) Field of Classification Search
None
See application file for complete search history.

(56) References Cited

U.S. PATENT DOCUMENTS

2016/0188123 A1* 6/2016 Fujiune ................ H04N 9/3158
345/156
2018/0357032 A1* 12/2018 Popovich ............ H04L 12/1813
(Continued)

FOREIGN PATENT DOCUMENTS

JP    2007149053 A    6/2007
JP    2016009214 A    1/2016
(Continued)

OTHER PUBLICATIONS

K. Sasaki et al., Design of a room with projected functionalities, IPSJ symposium, Symposium of 2013 Entertainment Computing [online], Information Processing Society of Japan, Sep. 2013, pp. 292-296.
(Continued)

*Primary Examiner* — Parul H Gupta
(74) *Attorney, Agent, or Firm* — Hoffmann & Baron, LLP (57) ABSTRACT

A position of a user is recognized. A display unit (102) displays a content-display-frame (112). A determination unit (103) determines whether the position of the user is within a predetermined range from a wall surface (12) or not. The display control unit (104) configured to display a content-display-frame on a floor surface (11) when the position of the user is farther than the predetermined range from the wall surface, and configured to display an operation input area (113) that receives an operation input from the user on the wall surface while displaying a content-display-frame to span from the floor surface to the wall surface when the position of the user is within the predetermined range from the wall surface.

6 Claims, 9 Drawing Sheets

(51) Int. Cl.
   *G06T 7/20*         (2017.01)
   *G06T 7/70*         (2017.01)

(52) U.S. Cl.
   CPC ...... *G06T 7/70* (2017.01); *G06T 2207/30196* (2013.01)

(56) References Cited

U.S. PATENT DOCUMENTS

2019/0121522 A1* 4/2019 Davis .................... G06V 40/28
2020/0410769 A1* 12/2020 Lee ........................ G06F 3/017

FOREIGN PATENT DOCUMENTS

| JP | 2016169080 A | 9/2016 |
| JP | 2017146927 A | 8/2017 |
| WO | 2016103543 A1 | 6/2016 |
| WO | 2016103560 A1 | 6/2016 |

OTHER PUBLICATIONS

International Search Report corresponding to Application No. PCT/JP2020/000044 dated Mar. 17, 2020.
Japanese Office Action corresponding to Application No. 2019-001246, dated Sep. 9, 2022.
English-language translation of a Notice of Allowance issued in Japanese Patent Application No. JP 2019-001246 dated Feb. 28, 2023.

* cited by examiner

INFORMATION DISPLAY SYSTEM AND INFORMATION DISPLAY METHOD

CROSS-REFERENCE TO RELATED APPLICATIONS

This application is the U.S. National Phase Application of International Application No. PCT/JP2020/000044, filed on Jan. 6, 2020, and asserts priority to Japanese Patent Application No. 2019-001246 filed on Jan. 8, 2019, all of which are hereby incorporated by reference in their entirety.

TECHNICAL FIELD

The present invention relates to an information display system and an information display method. Priority is claimed on Japanese Patent Application No. 2019-001246, filed Jan. 8, 2019, the content of which is incorporated herein by reference.

BACKGROUND ART

Information and images that can be recognized even from a distant position can be displayed by using an entire wall surface as a screen. Movie screens are a primitive example thereof. In recent years, a media façade or the like that uses an outer wall of a building as an information display has also been used. In digital art installations, expression methods and tools drawing pictures on a wall surface or interacting with animation images on a wall surface have been proposed. Electronic whiteboard tools and the like can draw characters and pictures on a wall surface of an electronic whiteboard while communicating with a plurality of persons in a physical space, and at the same time, can convert records of items drawn on the wall surface into electronic data. In public spaces, interactive advertisements and information terminals using touch screens are used as digital signage. Patent Document 1 discloses a technology for displaying a map on a floor surface.

CITATION LIST

Patent Document

[Patent Document 1]
Japanese Unexamined Patent Application, First Publication No. 2007-149053

SUMMARY OF INVENTION

Technical Problem

In a public space, it is assumed that there are a plurality of persons in one space, and the positional relationships between persons and a wall surface are diverse. When information is presented using an entire wall surface of a public space, a size at which the information is displayed and a means by which a person interacts appropriately with the information varies depending on a distance between an interactive display wall surface and the person. In particular, the appropriate relationship is roughly divided into information for a plurality of persons and information for individuals. In other words, information for a plurality of persons who are farther than a certain distance from the wall surface, the visibility to the plurality of persons will be improved if the information is presented by enlarging the wall surface. On the other hand, when an individual interacts individually with information through a touch operation or the like, it is assumed that there is a person in a place close enough to reach the wall surface. For this reason, even if a display size of characters and information is small, it can be visually recognized by the person at a close position. In addition, large-sized information provided to a plurality of persons and small-sized information provided to individuals may be mixed on one large wall surface. In this case, it is desired to provide a plurality of persons who are far from the wall surface with a display area for personal information and a display area for information shared by the plurality of persons such that they can explicitly understand these display areas.

An object of the present invention is to provide an information display system and an information display method that an information displays such that information shared by a plurality of persons and personal information can be distinguished among the information provided in a space where a plurality of persons gather, and that improves acquisition and operability for both the plurality of persons and individuals.

Solution to Problem

An information display system according to one aspect of the present invention includes a position recognition unit configured to recognize a position of a user, a display unit configured to display a content-display-frame on an area of at least one of a floor surface and a wall surface corresponding to the recognized position of the user, a determination unit configured to determine whether the position of the user is within a predetermined range from the wall surface or not, and a display control unit configured to display the content-display-frame on the floor surface when the position of the user is farther than the predetermined range from the wall surface, and to display an operation input area that receives an operation input from the user on the wall surface while displaying at least a part of the content-display-frame on the wall surface when the position of the user is within the predetermined range from the wall surface on the basis of a result of determination by the determination unit.

An information display method according to another aspect of the present invention includes a process of recognizing a position of a user, a process of displaying a content-display-frame on an area of at least one of a floor surface and a wall surface corresponding to the recognized position of the user, a process of determining whether the position of the user is within a predetermined range from the wall surface or not, and a process of displaying the content-display-frame on the floor surface when the position of the user is farther than the predetermined range from the wall surface, and displaying an operation input area that receives an operation input from the user on the wall surface while displaying at least a part of the content-display-frame on the wall surface when the position of the user is within the predetermined range from the wall surface on the basis of a result of the determination.

Advantageous Effects of Invention

According to the present invention, if a user approaches to a position close to the wall surface, a content-display-frame is displayed to span from the floor surface to the wall surface and the content-display-frame of the wall surface is an operation input area that receives an operation input from the user. As a result, information shared by a plurality of persons and personal information are explicitly shown and each user is capable of preforming an operation using a dedicated operation input in the space where the plurality of persons gather.

DESCRIPTION OF EMBODIMENTS

Figure 1:
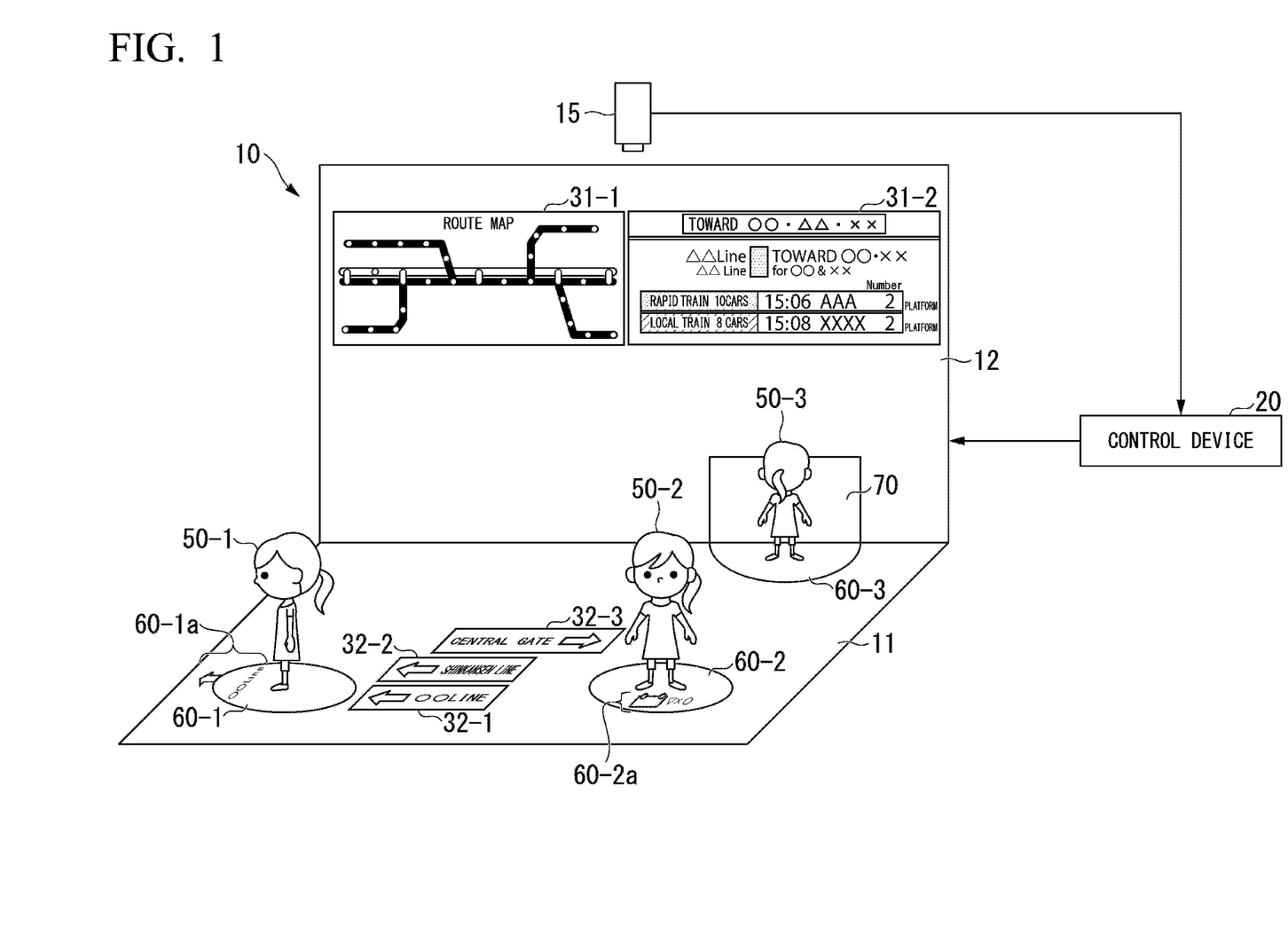
FIG. 1 is a diagram which shows an outline of an information display system according to an embodiment of the present invention.

In the following description, embodiments of the present invention will be described with reference to the drawings. FIG. 1 is a diagram which shows an outline of an information display system according to an embodiment of the present invention. The information display system according to the present embodiment can be applied to a space used by a plurality of people. The information display system may be applied to, for example, a station (a waiting place, a waiting room, a concourse, or the like), an airport, a park, a commercial facility, a building entrance, a sidewalk, a museum, a hospital, a public facility, an event venue, or the like. FIG. 1 illustrates an example in which the information display system is used in a station where a plurality of persons gather (for example, a waiting area of a station).

In FIG. 1, there are at least a floor surface 11 and a wall surface 12 in a space 10 of the waiting area of a station. All or at least a partial area of the floor surface 11 and the wall surface 12 are capable of being used as a display surface. The floor surface 11 and the wall surface 12 have a function as a display surface by projecting an image based on a video signal thereto by a projector, a light emitting diode (LED) module, or the like. A camera 15 or a motion sensor are capable of detecting whether a user has operated an operation input in the vicinity of the floor surface 11 or the wall surface 12. In addition to the camera 15, the motion sensor, a 3D scanner, a touch sensor, or the like may be used to detect the operation of an input of a user.

The camera 15 capable of capturing an entire space 10 or at least the floor surface 11 and the wall surface 12 of the waiting area of a station is provided. The camera 15 captures images of positions and operations of each of users 50-1, 50-2, and 50-3 who have visited the space 10. Furthermore, a 3D scanner that detects the positions and operations of each of the users 50-1, 50-2, and 50-3 may be provided, and information about the positions and operations of each user may be acquired from the 3D scanner.

A control device 20 is provided in the space 10 of the waiting area of a station. The control device 20 supplies a video signal to a projector or an LED module. The projector or LED module projects (displays) an image generated based on the video signal supplied from the control device 20 onto the floor surface 11 or the wall surface 12. The image includes drawing and character information.

In FIG. 1, the floor surface 11 and the wall surface 12 are used as areas that provides information shared by a plurality of users 50-1, 50-2, and 50-3 who have visited the space 10. In this example, images 31-1 and 31-2 are displayed on the wall surface 12. The images 31-1 and 31-2 are visually recognized by any of the users 50-1, 50-2, and 50-3, and are used as shared information by the users. It is preferable that such shared information may be displayed at a position or in a size configured to be visually recognized by a user who is located at a position away from the wall surface 12. For example, it is preferable that the shared information have a height above a certain level from the floor surface 11 on the wall surface 12 and a display size of an image be set to a certain size from a viewpoint of visibility. A plurality of images 32-1, 32-2, and 32-3 are displayed on the floor surface 11. Each of the images 32-1, 32-2, and 32-3 are capable of being visually recognized by any of the users 50-1, 50-2, and 50-3, and are usable as shared information. Shared information displayed on the floor surface 11 may also be visually recognized by a user who is at a position some distance away from a position displayed on the floor surface 11.

Information on the positions and operations of each of the users 50-1, 50-2, 50-3 who have visited the space 10 of the waiting area of a station is acquired by recognizing an image captured by the camera 15. The camera 15 captures the floor surface 11 to generate a captured image including each of the users 50-1, 50-2, and 50-3. The control device 20 detects the positions of each of the users 50-1, 50-2, and 50-3 on the floor surface from the captured image. The control device 20 displays content-display-frames 60-1, 60-2, and 60-3, which indicate that the users 50-1, 50-2, and 50-3 are detected, respectively, at feet of each of the users 50-1, 50-2, and 50-3 on the basis of the detected positions. By displaying the content-display-frames 60 at the positions corresponding to the users, it is possible to explicitly display that the content-display-frames are information for individual users assigned to each user. In this manner, shared information and personal information can be explicitly displayed separately. For this reason, the user can easily ascertain whether information is for himself/herself or is shared information for the general public. Here, the content-display-frames may be displayed under the feet of all the users 50-1, 50-2, and 50-3, or may be displayed under the feet of at least one user.

The content-display-frames 60-1, 60-2, and 60-3 may be in a frame of an annular shape, a rectangular shape, or a broken line shape. The content-display-frames 60-1, 60-2, and 60-3 may be figures that surround target users with a line. An inner circumferential side of the content-displayframe may be displayed (solidified) in any color. The content-display-frames 60-1, 60-2, and 60-3 may be graphic symbols such as animals and plants, or may be characters or the like.

For example, in the content-display-frame 60-1, as personal information for the user 50-1 in the content-display-frame 60-1, an arrow extending from an outer circumference of the content-display-frame 60-1, and a character string indicating a destination are displayed on a front side of the user 50-1 in the content-display-frame 60-1 (a reference numeral 60-1a). As a result, the user 50-1 of the content-display-frame 60-1 can be guided to the destination. In the content-display-frame 60-2, as personal information for the user 50-2 in the content-display-frame 60-2, a character string and a bus icon are displayed side by side in front of the user 50-2 in the content-display-frame 60-2. As a result, it is possible to provide information on a bus to the user 50-2 of the content-display-frame 60-2. In this manner, an image in which guidance displays that are personalized for each user and combine arrows, characters, icons, and the like are integrated or combined may also be displayed in the content-display-frame.

When each of the users 50-1, 50-2, and 50-3 moves on the floor surface 11, the camera 15 captures an image of the floor surface 11 including a moving user, and detects positions of each of the users 50-1, 50-2, and 50-3 on the floor surface 11. The control device 20 displays the content-display-frames 60-1, 60-2, and 60-3 on the floor surface 11 to follow positions corresponding to the positions of the users 50-1, 50-2, and 50-3, respectively, on the basis of the positions of the users obtained from the camera 15. If the users 50-1, 50-2, and 50-3 come within a predetermined distance of the wall surface 12, at least a part of the content-display-frames 60-1, 60-2, and 60-3 displayed on the floor surface 11 is displayed to span from the floor surface 11 to the wall surface 12 and to extend to the wall surface 12. In FIG. 1, the control device 20 determines that the user 50-3 has come within a predetermined distance from the wall surface 12, and thus the control device 20 displays the content-display-frame 60-3 to span from the floor surface 11 to the wall surface 12 and extends to the wall surface 12.

In FIG. 1, a plurality of the users 50-1, 50-2, and 50-3 are shown, but when users 50-1, 50-2, and 50-3 are not distinguished, they may be simply described as a user 50 in the following description. The number of the plurality of content-display-frames 60-1, 60-2, and 60-3 corresponds to the number of the plurality of the users 50-1, 50-2, and 50-3, but when the content-display-frames 60-1, 60-2, and 60-3 are not distinguished, they may be simply described as a content-display-frame 60 in the following description. When the plurality of images 31-1 and 31-2 and images 32-1, 32-2 and 32-3 are not distinguished, they may be simply described as an image 31 and an image 32 in the following description.

A means for displaying an image onto the floor surface 11 and the wall surface 12 is not limited to a projector, an LED module, or the like and other devices or modules may be used. In the present embodiment, the means for displaying is desirable that the display surface have no shadow. When an image is displayed onto the floor surface 11, it is desirable to use a projection means that is not easily affected by a load on the floor surface 11 or wear of the floor surface 11. The display surfaces of the floor surface 11 and the wall surface 12 may be separated from each other. The display surfaces of the floor surface 11 and the wall surface 12 are preferably in contact with each other so that continuity of one content-display-frame can be maintained in the display. An angle between the floor surface 11 and the wall surface 12 may be a right angle or they may form a continuous surface with a curved boundary portion.

Figure 2:
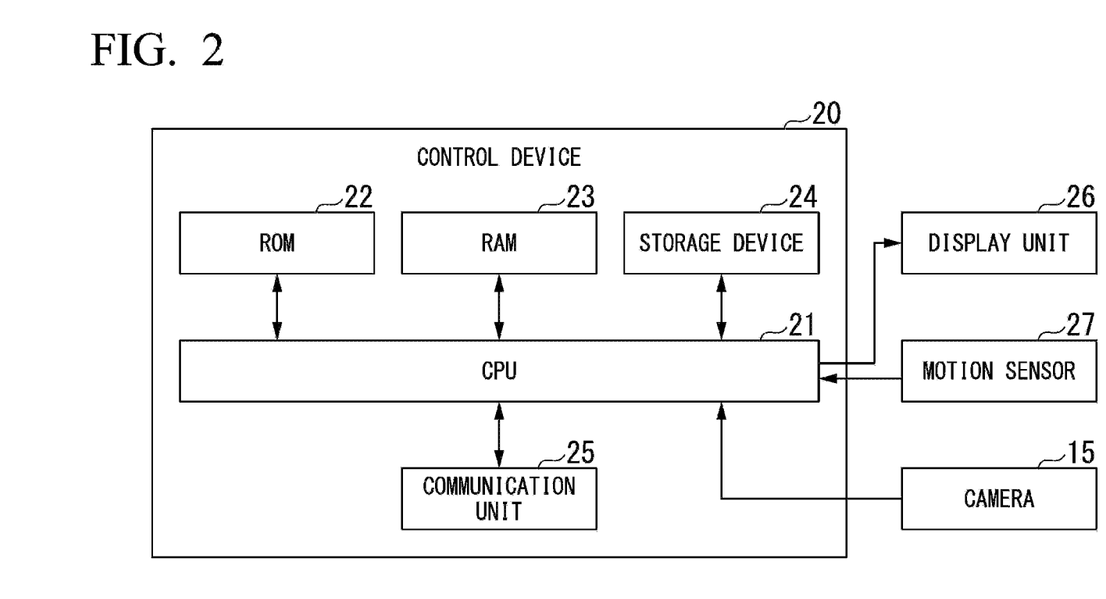
FIG. 2 is a block diagram which shows an outline of a control device in the information display system according to the embodiment of the present invention.

FIG. 2 is a block diagram which shows an outline of the control device 20 in the information display system according to the present embodiment. As shown in FIG. 2, the control device 20 is configured to include a central processing unit (CPU) 21, a read only memory (ROM) 22, a random access memory (RAM) 23, a storage device 24, and a communication unit 25. The CPU 21 interprets a command and executes it. A booting program is stored in the ROM 22. The RAM 23 is used as a main memory. The storage device 24 is configured to include a hard disk drive (HDD) and a solid state drive (SSD), and stores programs and data of an operating system (OS) and an application.

A display unit 26, a motion sensor 27, and a camera 15 are connected to the control device 20. The display unit 26 is, for example, a projector or an LED module, and displays an image on an area of an entire surface or a part of the floor surface 11 or the wall surface 12. The camera 15 captures images of the floor surface 11 and the wall surface 12, and performs image processing on the basis of a result of the image-capturing, thereby detecting a movement of the user 50 present in the image-capturing area and outputting a result of the detection to the control device 20. The control device 20 causes the display unit 26 to display an image corresponding to a result of detecting the movement of the user 50 input from the camera 15 on the floor surface 11 or the wall surface 12.

In this embodiment, the movement of the user 50 can be detected on the basis of a result of the image-capturing by the camera 15. The movement of the user 50 may also be detected using a motion sensor 27. The motion sensor 27 emits light with a predetermined wavelength such as infrared rays or laser light, and receives emitted reflected light to detect an object present in the surroundings. The motion sensor 27 detects a movement of the object on the basis of a detection result of detecting the object. The motion sensor 27 outputs the detection result of detecting the object and a result of detecting the movement of the object to the CPU 21. The motion sensor 27 is attached to, for example, a ceiling of the space 10 or a wall surface near the ceiling. When such a camera 15 or motion sensor 27 is used, any of a position at which the user 50 is located, for example, a position at which the user 50 is in contact with the floor surface, how closely the user approaches the wall surface when the user 50 is not in contact with the wall surface, and a place of the wall surface that the user 50 is touching when the user is in contact with the wall surface can be acquired. When the camera 15 or the motion sensor is used, an interaction based on the movement of the user 50, a situational determination based on a degree to which the user 50 approaches a wall or a display area, an explicit operation of the user touching a display surface, and the like can be realized. In addition to the camera 15 and the motion sensor 27, the movement of the user 50 may be detected on the basis of a detection result by the 3D scanner. When a touch panel is provided on the wall surface 12, it is possible to directly detect whether a touch operation has been performed or not, which improves detection accuracy.

The control device 20 functions as a position recognition unit that recognizes the position of the user 50 by analyzing an image-capturing screen of the camera 15. A process of recognizing the user 50 included in a captured image may be performed by the camera 15 or may be performed by the control device 20.

The display unit 26 is, for example, a projector or an LED module. The display unit 26 displays (projects) the content-display-frame 60 on either area of the floor surface 11 (a horizontal surface) or the wall surface 12 (a vertical surface) corresponding to the recognized position of the user 50. The floor surface is not limited to a horizontal surface, but includes an inclined surface. The wall surface is not limited to a vertical surface, but includes an inclined surface. The floor surface and the wall surface may also be curved surfaces as long as a content-display-frame can be displayed thereon.

The control device 20 functions as a determination unit that determines whether the position of the user 50 is within a predetermined range from the wall surface 12 or not, and a display control unit that controls the content-display-frame 60 based on a result of the determination by the determination unit. The control device 20 preforms to display the content-display-frame 60 on the floor surface 11 when the position of the user 50 is farther than the predetermined range from the wall surface 12. When the control device 20 determines that the position of the user 50 is within the predetermined range from the wall surface 12, the control device 20 causes the display unit 26 to display the operation input area 70 that receives an operation input from the user 50 on the wall surface 12 while displaying the content-display-frame 60 to span from the floor surface 11 to the wall surface 12.

The control device 20 functions as an operation detection unit that detects the operation of the user 50 by analyzing an image-capturing screen of the camera 15. The control device 20 functions as a display control unit that changes a display mode of the content-display-frame 60 according to the operation of the user 50. More specifically, the control device 20 functions as a display control unit that enlarges and reduces the content-display-frame 60, merges the content-display-frame with a content-display-frame of another user 50, and the like.

The control device 20 functions as a display control unit that causes the display unit 26 to display individual areas for displaying content-display-frames assigned to the plurality of users 50 as one shared area for the plurality of users 50 who have performed an operation representing sharing on the basis of a result of detection in which the operations of the plurality of users 50 are detected.

The control device 20 functions as a display control unit that causes the display unit 26 to display the content-display-frame 60 including a machine reading code 62 (refer to FIG. 5) on the wall surface 12. The machine reading code is configured to be photographed and read by a terminal device 63 of the user 50. If the communication unit 25 receives a machine reading code transmitted from the terminal device that has read the machine reading code, the communication unit functions that transmits information related to display content including the machine reading code to the terminal device 63.

Figure 3A:
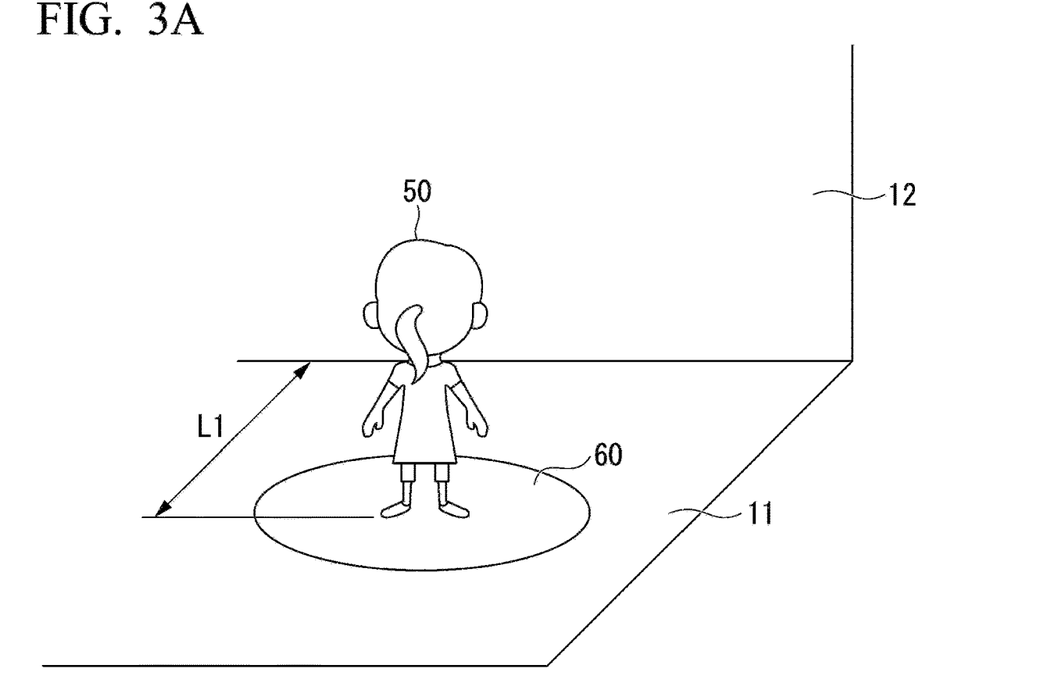
FIG. 3A is a diagram which describes a relationship between a position of a user and a content-display-frame.

FIGS. 3A and 3B are diagrams that describe a relationship between the position of the user 50 and a content-display-frame. As shown in FIG. 3A, when a distance L1 between the position of the user 50 on the floor surface 11 and the wall surface 12 is longer than a predetermined distance, the content-display-frame 60 is displayed on the floor surface 11 to surround the feet of the user 50. The predetermined distance of the distance L1 is a distance in which the user 50 can touch the wall surface 12 using hand. As the predetermined distance of the distance L1, for example, an arbitrary distance in a range of about several tens of centimeters to about 1 meter can be set. For example, the control device 20 detects a distance from the position of the user 50 on the floor surface 11 to the wall surface 12.

Figure 3B:
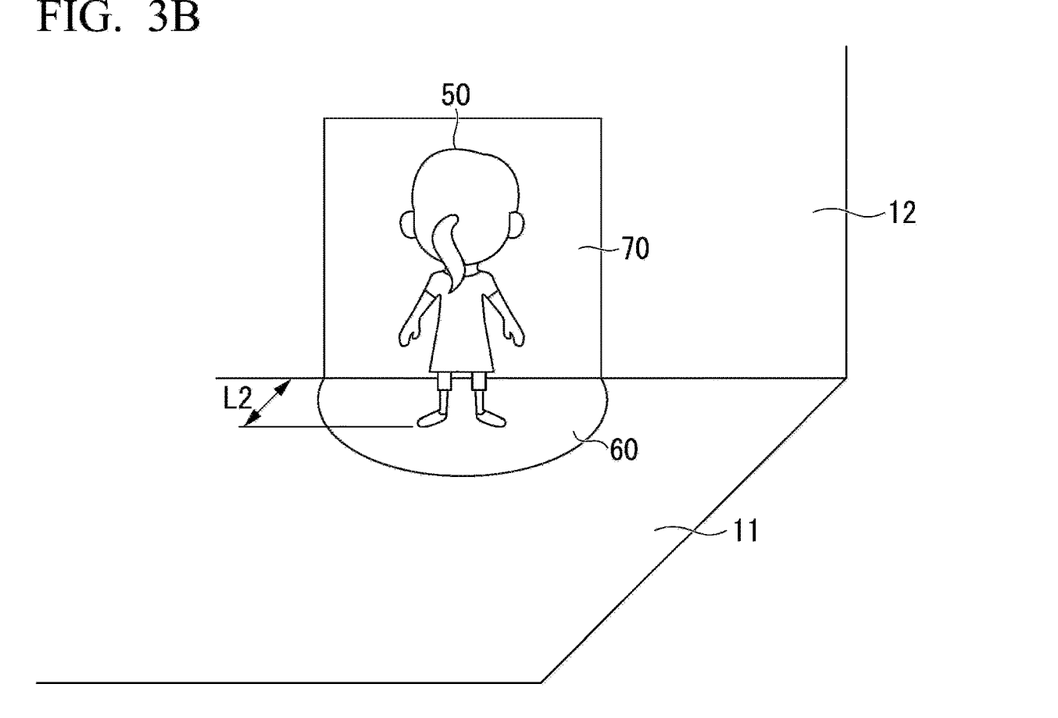
FIG. 3B is a diagram which describes a relationship between the position of a user and the content-display-frame.

As shown in FIG. 3B, if the distance L2 between the position of the user 50 and the wall surface 12 is shorter than the predetermined distance, the control device 20 displays the content-display-frame to span from the floor surface 11 to the wall surface 12. A portion of the content-display-frame 60 that is displayed on the wall surface 12 is used as the operation input area 70 in which the user 50 individually performs an interaction. A height of an upper end of the operation input area 70 on the wall surface 12 may be displayed having a height depending on a height of the detected user 50, for example, a height may be equal to or to be greater by a certain level than the height that the user is easy to operate by extending their hand to the wall surface 12. As a result, user 50 does not have to crouch or jump to operate within the content-display-frame 60.

Figure 4:
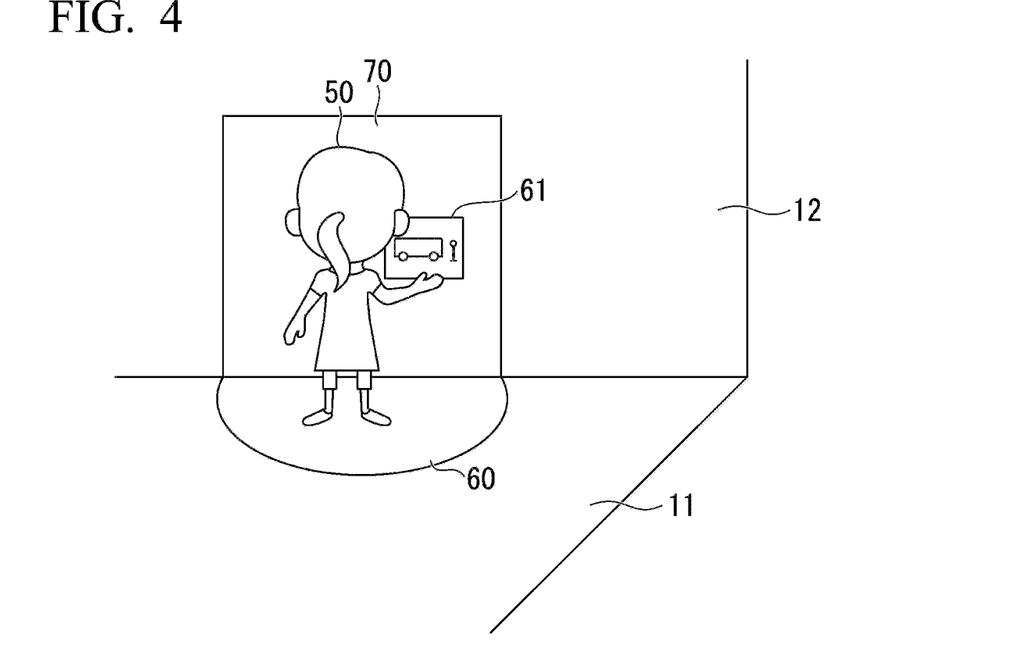
FIG. 4 is a diagram which describes an example in which the content-display-frame is used as an operation interface of an application program for each user.

FIG. 4 is a diagram which describes an example in which the operation input area 70 is used as an operation interface of an application program for each user 50. As shown in FIG. 4, an icon 61 is displayed in the operation input area 70. If the user 50 touches the icon 61 on the operation input area 70, a desired application program is started and displayed on the operation input area 70. In FIG. 4, an icon of a bus is projected onto the operation input area 70 as the icon 61.

Figure 5:
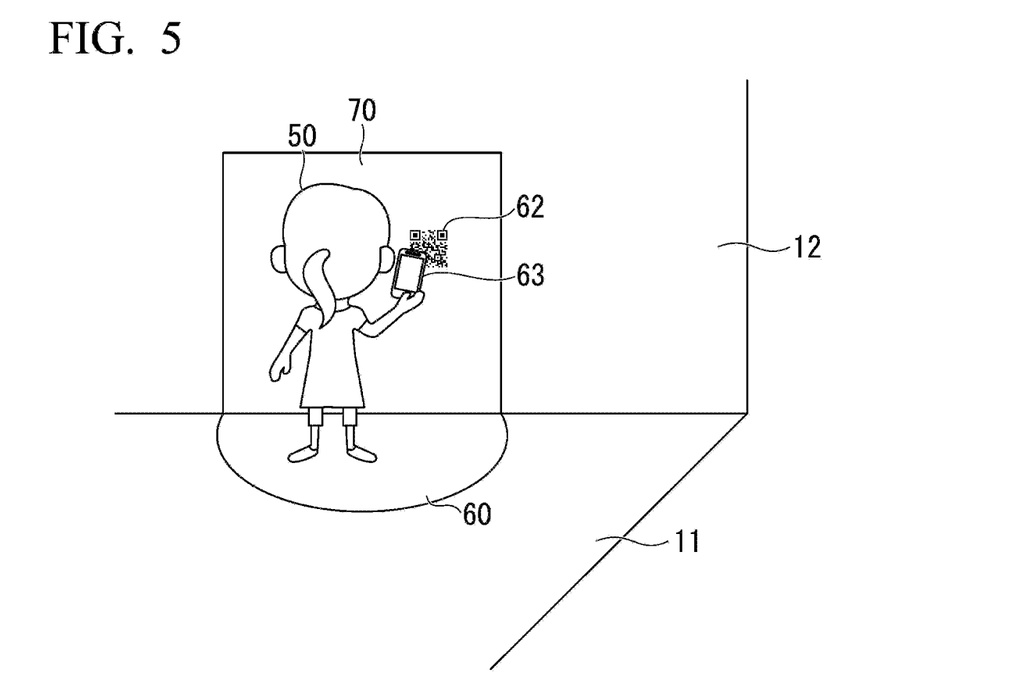
FIG. 5 is a diagram which describes a case in which the content-display-frame is used for an information input operation for each user.

FIG. 5 is a diagram which describes a case in which the operation input area 70 is used for the information input operation for each user 50. As shown in FIG. 5, a machine reading code 62 is displayed in the operation input area 70. The machine reading code 62 is a code readable by an image-capturing device, such as a bar code and a two-dimensional bar code. FIG. 5 shows an example in which the machine reading code 62 is a two-dimensional bar code. The user 50 photographs the machine reading code 62 using his or her terminal device 63. If the user 50 photographs the machine reading code 62 using the terminal device 63, the terminal device 63 and the control device 20 communicate with each other, and information related to the machine reading code 62 is displayed in the operation input area 70. For example, when an operation that the user 50 has touched the icon 61 in FIG. 4 is detected, the control device 20 is configured to display information according to the operation of the user 50, such as displaying the machine reading code 62. For example, the control device 20 can associate user identification information with the operation input area 70 of the wall surface 12 by using identification information assigned to the terminal device 63 as the user identification information. As long as the user identification information can be specified, other realization means may be used. For example, the association between the user identification information and the operation input area 70 may be an authentication method using short-range communication such as beacon, an authentication method combined with image analysis from a camera, and the like.

Figure 6:
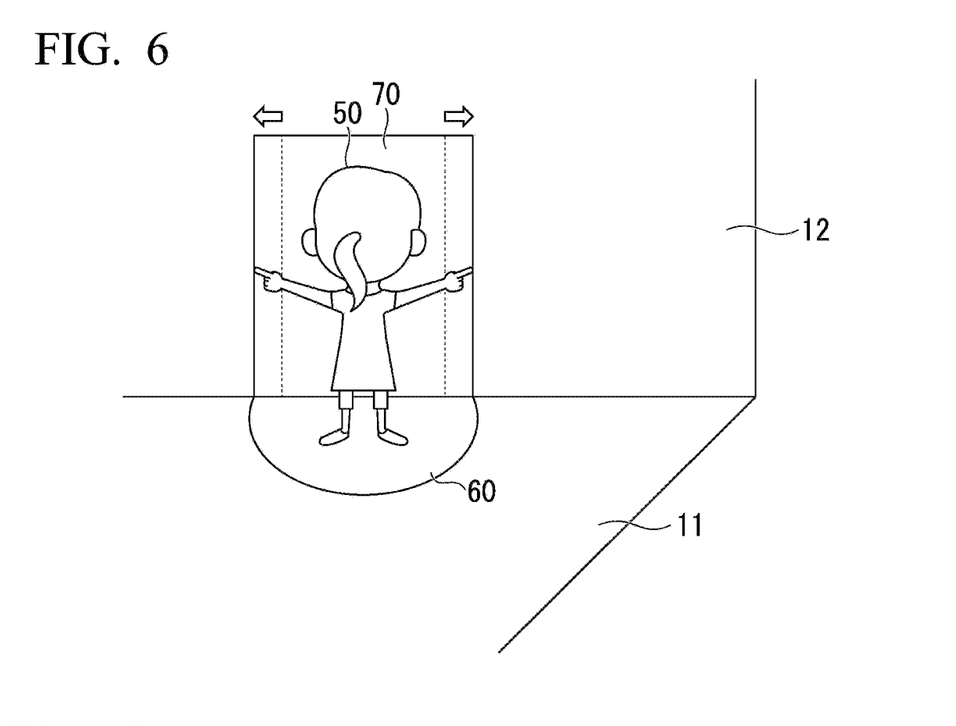
FIG. 6 is a diagram which describes an operation when a size of the content-display-frame is enlarged or reduced.

A size of the content-display-frame 60 is configured to be enlarged and reduced by operating the operation input area 70. FIG. 6 is a diagram which describes an operation when the size of the content-display-frame 60 is enlarged and reduced. As shown in FIG. 6, if the user 50 performs a sliding operation that is an operation of expanding a right end and a left end of the operation input area 70 outward (in a direction in which both ends are separated from each other), respectively, while touching the wall surface 12 to expand the inside of the operation input area 70, the control device 20 detects the operation of the user 50 and enlarges the size of the content-display-frame 60 in a width direction according to the operation of the user 50. If the user 50 performs an operation of narrowing the right end and the left end of the operation input area 70 inward (a direction in which a distance from each other is closer), respectively, while touching the wall surface 12 as the sliding operation, the size of the content-display-frame 60 in the width direction is reduced. In FIG. 6, a case of changing the size of the operation input area 70 in the width direction has been described, but, when the user 50 extends both hands upwards or pulls down both arms, the control device 20 may detect the operation of the user, and display the content-display-frame 60 such that the size in a height direction is expanded or contracted. In FIG. 6, a case of the sliding operation in which the user 50 changes the size of the operation input area 70 in the width direction while touching the wall surface 12 has been described. As another example of the sliding operation, even if the user 50 does not touch the wall surface 12, when an operation input by the user 50 can be detected, the sliding operation input may be configured to be received as an operation input.

Figure 7A:
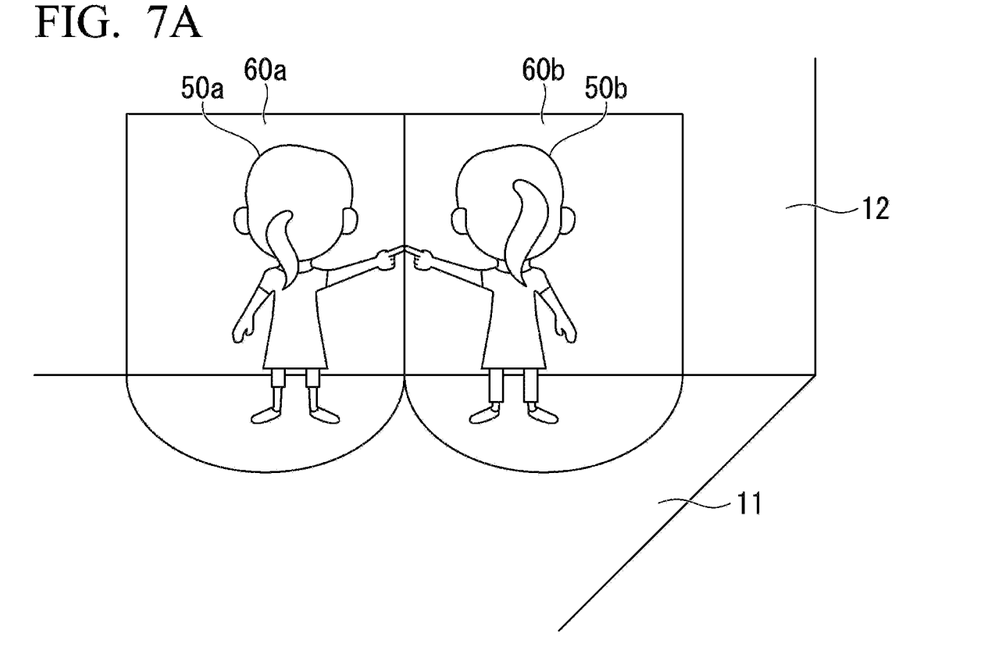
FIG. 7A is a diagram which describes integration of the content-display-frame.
Figure 7B:
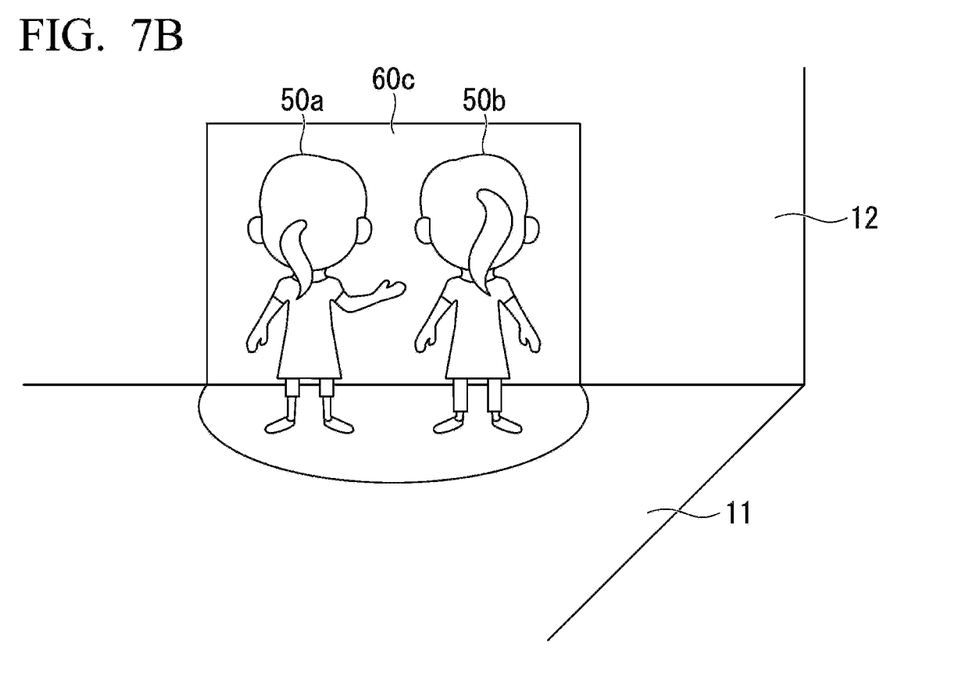
FIG. 7B is a diagram which describes integration of the content-display-frame.

When there is another user 50 nearby, if the content-display-frame 60 is enlarged, the content-display-frames of the adjacent users 50 may overlap. In this case, the content-display-frames may be integrated and displayed as one content-display-frame. FIGS. 7A and 7B are diagrams which describe the integration of content-display-frames. In this example, a case in which a content-display-frame 60a and a content-display-frame 60b are integrated and displayed as one content-display-frame will be described. A user 50a near the wall surface 12 and another user 50b adjacent to the user 50a touch an end of a side where each adjacent user 50 is present among a right end and a left end of a content-display-frame assigned to each other, and perform operation inputs such that the ends are in contact with each other. When the control device 20 has detected such an operation input, the control device 20 configured to integrate the content-display-frames of each user 50 who has performed an operation input such that the ends of the content-display-frames are in contact with each other as shown by a reference numeral 60c in FIG. 7B. The integration of the content-display-frames can be performed even with the content-display-frames of three or more users 50.

In the wall surface 12, information of common content and information of different content for a plurality of users 50 may be displayed in the operation input area 70 assigned to each of the users 50.

Figure 8:
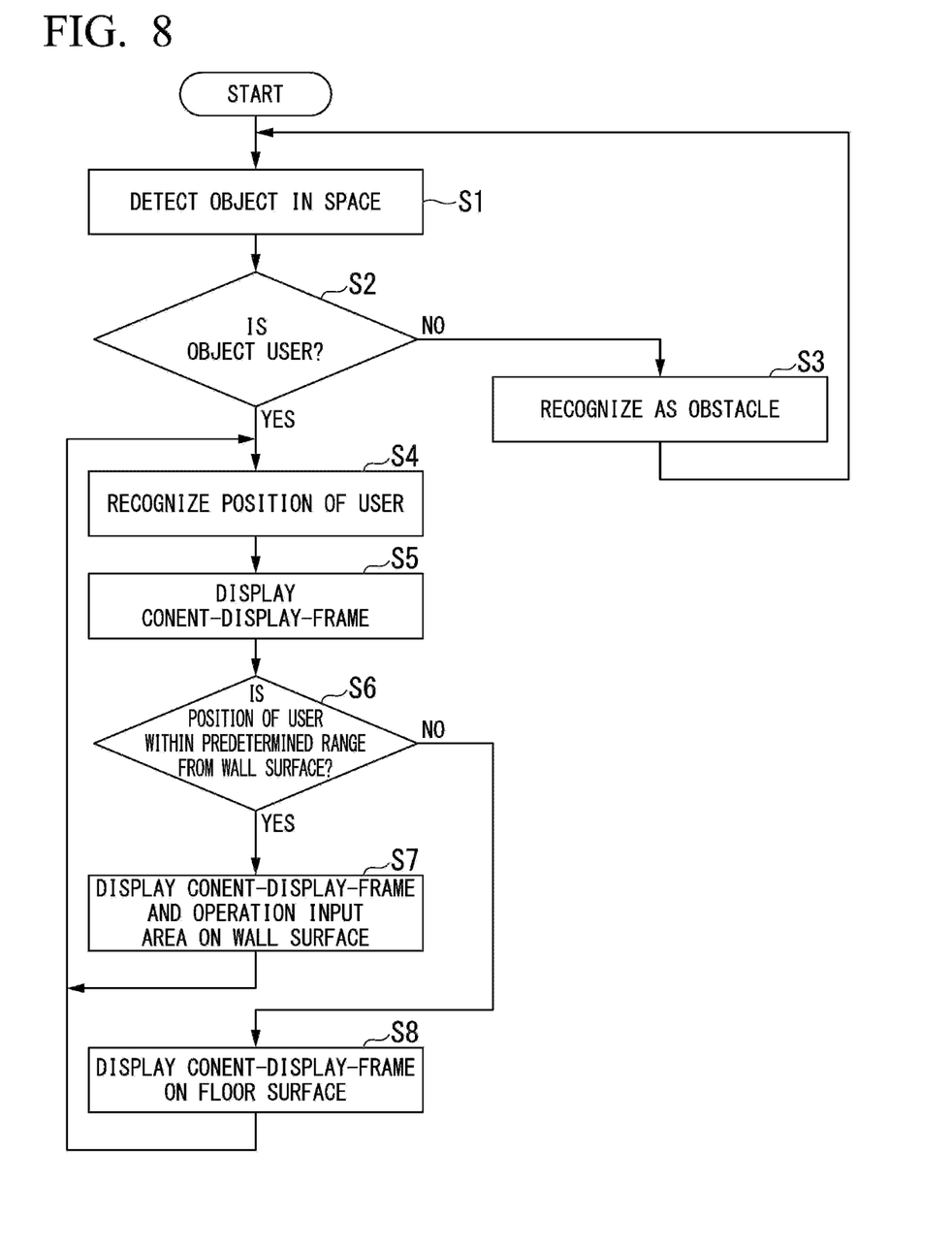
FIG. 8 is a flowchart which shows processing in the information display system according to the embodiment of the present invention.

Next, an information display method according to this embodiment will be described. FIG. 8 is a flowchart which shows an information display method according to the present embodiment.

(Step S1) An inside of a space is photographed using the camera 15 to detect an object in the space. When the control device 20 detects an object within image-capturing data, the control device 20 advances the processing to step S2.

(Step S2) The control device 20 determines whether the detected object is a user (person) or an obstacle. When the control device 20 determines that the detected object is not a person (NO), the control device 20 recognizes the object as an obstacle and returns the processing to step S1 (step S3). When the object is a person (YES), the processing proceeds to step S4.

(Step S4) The position recognition unit 101 recognizes the position of the user 50. The position recognition unit 101 specifies the position of the user 50 with respect to the floor surface 11 and the wall surface 12. When the position recognition unit 101 specifies the position of the user 50, the processing proceeds to step S5.

(Step S5) The control device 20 transmits a signal for displaying the content-display-frame in an area of at least one of the floor surface 11 (the horizontal surface) and the wall surface 12 (the vertical surface) corresponding to the position of the user 50 recognized by the position recognition unit 101 to the display unit. For example, since the user 50 stands on the floor surface 11, the content-display-frame is displayed on the floor surface 11. The display unit 26 projects a content-display-frame onto the floor surface 11 at the feet of the user 50 based on the received signal. Subsequently, the processing proceeds to step S6.

(Step S6) The control device 20 determines whether the position of the user 50 specified in step S4 is within a predetermined range from the wall surface 12 or not. The predetermined range from the wall surface 12 is, for example, a range in which the user 50 can touch the wall surface 12 by hand when the user 50 extends his or her hand toward the wall surface 12 from a position where the user 50 stands. When the control device 20 determines that the position of the user 50 is within the predetermined range from the wall surface 12 (YES), the processing proceeds to step S7. When the control device 20 determines that the position of the user 50 is outside the predetermined range from the wall surface 12 (NO), the processing proceeds to step S8.

(Step S7) When the position of user 50 is within the predetermined range from the wall surface 12, at least a part of the content-display-frame is displayed on the wall surface 12, and an operation input area that receives an operation input from the user 50 is displayed on the wall surface. Details of the displayed operation input area will be described below.

(Step S8) When the position of the user 50 is farther than the predetermined range from the wall surface 12, the control device 20 transmits a signal to the display unit 26, and the display unit 26 projects and displays a content-display-frame onto the floor surface 11 at the feet of the user 50.

The control device 20 returns to step S4 after step S7 and step S8, and the processing of step S4 to step S8 is repeated until the position of user 50 is recognized to be outside the floor surface 11.

Figure 9:
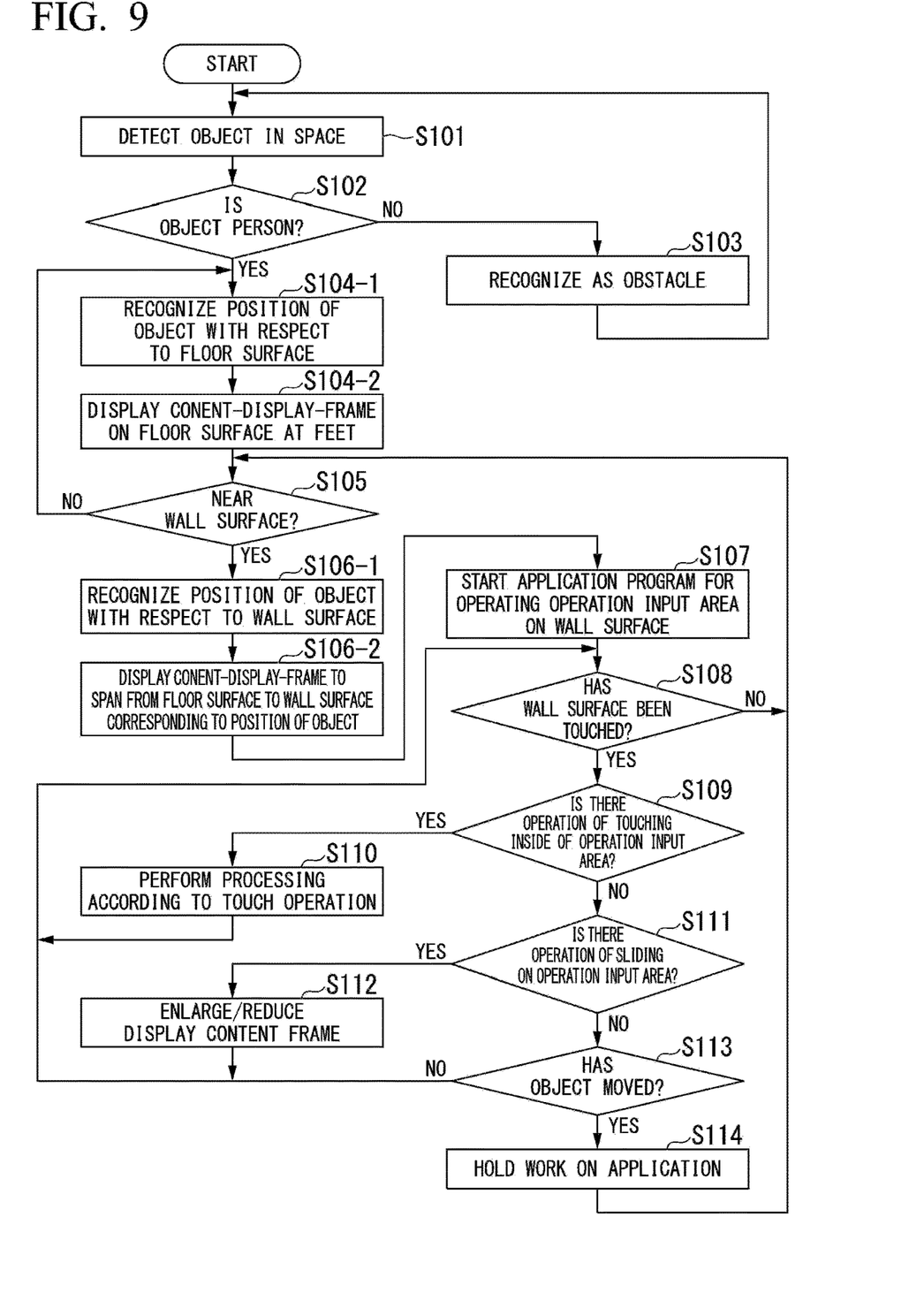
FIG. 9 is a flowchart which shows processing in the information display system according to the embodiment of the present invention.

FIG. 9 is a flowchart which shows a specific processing example of the information display system according to the embodiment of the present invention.

(Step S101) The control device 20 analyzes a captured image of the camera 15 and detects an object in the space 10 of the waiting area of a station. When the control device 20 detects the object, the control device 20 advances the processing to step S102.

(Step S102) The control device 20 determines whether the detected object is a person or not. If the control device 20 determines that the detected object is not a person (No in step S102), the control device 20 advances the processing to step S103. If the control device 20 determines that the detected object is a person (Yes in step S102), the processing proceeds to step S104-1.

(Step S103) If the detected object is not a person, the control device 20 recognizes the object as an obstacle and returns the processing to step S101.

(Step S104-1) When the detected object is a person, the control device 20 recognizes the person as a user and recognizes the position of the user 50 (a process of recognizing the position of the user). For example, the control device 20 analyzes the image-capturing screen of the camera 15 and recognizes the position of the user 50 with respect to the floor surface 11. After that, the processing proceeds to step S104-2.

(Step S104-2) A content-display-frame is displayed in the area of at least one of the floor surface 11 and the wall surface 12 corresponding to the position of the user 50 recognized in step S104-1 (a process of displaying a content-display-frame). For example, the control device 20 transmits a signal for displaying the content-display-frame 60 on the floor surface 11 to the display unit 26 to surround the feet of the detected user 50. The display unit 26 projects a content-display-frame onto the floor surface 11 at the feet of the user 50 based on the received signal. After that, the processing proceeds to step S105.

(Step S105) The control device 20 determines whether the detected position of the user 50 is near the wall surface 12 or not (a process of determining whether the position of the user is within a predetermined range from the wall surface or not). When the control device 20 determines that the detected user 50 is approaching the vicinity of the wall surface 12 (Yes in step S105), the control device 20 advances the processing to step S106-1. When the control device 20 determines that the detected position of the user 50 is not near the wall surface 12 (No in step S105), the control device 20 returns the processing to step S104-1. When the user 50 moves, a loop of step S104-1, step S104-2, and step S105 is repeated, and the content-display-frame 60 moves by following the movement of the user 50.

(Step S106-1) The control device 20 analyzes the image-capturing screen of the camera 15 and recognizes the position of the user 50 with respect to the wall surface 12. After that, the processing proceeds to step S106-2.

(Step S106-2) The control device 20 extends the content-display-frame 60 to the wall surface 12 and displays the content-display-frame 60 to span from the floor surface 11 to the wall surface 12 (a process of displaying the content-display-frame). After that, the processing proceeds to step S107.

(Step S107) The control device 20 starts an application program in which a portion of the content-display-frame 60 displayed on the wall surface 12 is the operation input area 70, and advances the processing to step S108 (a process of displaying the operation input area).

(Step S108) The control device 20 determines whether there has been an operation of touching the wall surface 12 or not. If the control device 20 determines that there has been an operation in which the user 50 touches the wall surface 12 (Yes in step S108), the control device 20 advances the processing to step S109, and, if the control device 20 determines that there is no operation (No in step S108), the control device 20 returns the processing to step S105.

(Step S109) The control device 20 determines whether the operation in which the user 50 touches the wall surface 12 is a touch operation into the operation input area 70 or not. When the control device 20 determines that the operation is the touch operation into the operation input area 70 (Yes in step S109), the control device 20 advances the processing to step S110. If the control device 20 determines that the operation is not the touch operation into the operation input area 70 (No in step S109), the control device 20 advances the processing to step S111.

(Step S110) The control device 20 processes the application program according to the touch operation, and returns the processing to step S108.

(Step S111) The control device 20 determines whether there is the sliding operation of the operation input area 70 or not. If the control device 20 determines that there is a sliding operation of the operation input area 70 (Yes in step S111), the control device 20 advances the processing to step S112. If the control device 20 determines that there is no sliding operation of the operation input area 70 (No in step S11), the control device 20 advances the processing to step S113.

(Step S112) The control device 20 enlarges or reduces the content-display-frame 60 in response to the sliding operation, and returns the processing to step S108.

(Step S113) The control device 20 determines whether the user 50 has moved or not. Based on a result of image-capturing by the camera 15 in time series, the control device 20 determines whether the user 50 has moved or not. When a movement amount of the user 50 is equal to or greater than a predetermined amount (YES), the control device 20 advances the processing to step S114. When the control device 20 determines that the movement amount of the user 50 is equal to or less than the predetermined amount (NO), the control device 20 returns the processing to step S108.

(Step S114) When the movement amount of the user 50 is within the predetermined amount, work on the application is held. In step S114, regarding a range of the predetermined amount of movement of the user 50, for example, when the user 50 moves along the wall surface 12 and the distance from the wall surface 12 does not change substantially, the control device 20 may determine that the movement is a movement within the range of the predetermined amount. That is, when the user 50 has moved in a left-right direction of the user 50 without changing the distance from the wall surface 12, a content-display-frame is displayed on the wall surface 12 such that the user 50 can continue to perform touching of the application program. In addition, when the movement amount of the user 50 is within a predetermined amount, a display position of the content-display-frame may be finely adjusted according to the movement of the user 50.

As described above, in the present embodiment, if the user 50 is detected in the space 10, the content-display-frame 60 indicating that the detected user 50 is detected is displayed on the floor surface 11 at the feet of the user 50. If the position of the user 50 approaches the wall surface 12, the content-display-frame 60 is displayed to span from the floor surface 11 to the wall surface 12, and a part of the content-display-frame 60 that extends to the wall surface 12 is the operation input area 70 that receives an operation input from the user 50. As a result, shared information and personal information are explicitly displayed on the wall surface 12 or the floor surface 11 in the space 10 in which a plurality of persons gather. Individual users 50 can operate the operation input area 70 with a dedicated operation input as an operation target range. Since the shared information and personal information are explicitly displayed, the control device 20 is configured to appropriately control a size of characters and a size of display according to a target user 50. For example, as the position of the user 50 approaches the wall surface 12, characters may be displayed in a smaller size. In this case, when the user 50 is at a position away from the wall surface 12, large characters are easy to be visually recognized, but, when the user 50 is at a position close to the wall surface 12, even small characters can be visually recognized.

Figure 10:
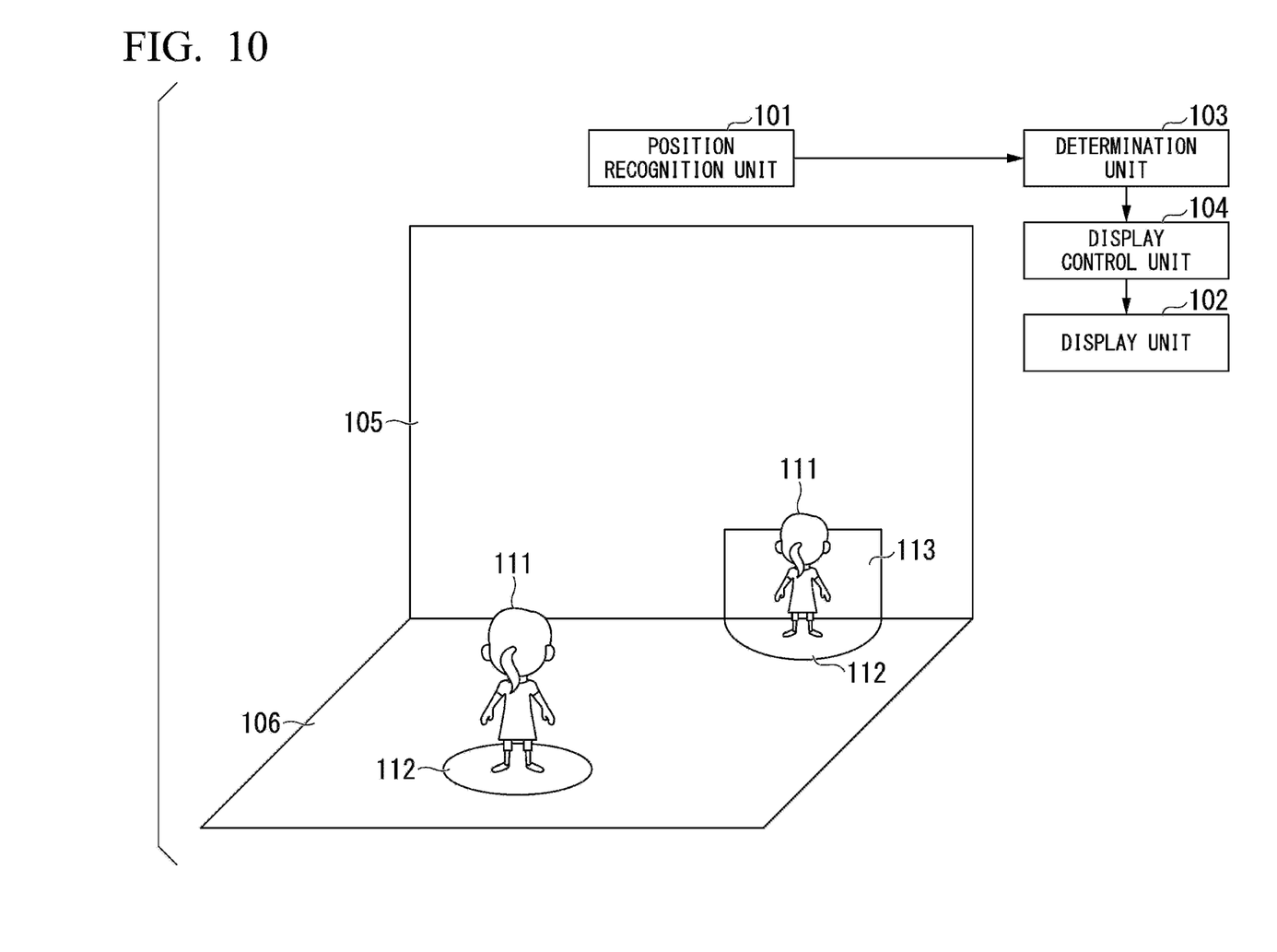
FIG. 10 is a schematic block diagram which shows a basic configuration of the information display system according to the present invention.

FIG. 10 is a schematic block diagram which shows a basic configuration of the information display system according to the present invention. The information display system according to the present embodiment includes a position recognition unit 101, a display unit 102, a determination unit 103, and a display control unit 104 as basic constituents. The position recognition unit 101 recognizes a position of a user 111. The display unit 102 displays a content-display-frame 112 in an area of at least one of a horizontal surface 106 and a vertical surface 105 corresponding to the recognized position of the user 111. The determination unit 103 determines whether the position of the user 111 is within a predetermined range from the vertical surface 105 or not. On the basis of a result of the determination by the determination unit 103, the display control unit 104 performs to display the content-display-frame 112 on the horizontal surface 106 when the position of the user 111 is farther than the predetermined range from the vertical surface 105. When the position of the user is within the predetermined range from the vertical surface 105, the display control unit 104 performs to display an operation input area 113 that receives an operation input from the user 111 on the vertical surface 105 while displaying the content-display-frame 112 to span from the horizontal surface 106 to the vertical surface 105.

All or a part of the information display system in the embodiment described above may be realized by a computer. In that case, a program for realizing this function may be recorded in a computer-readable recording medium, and the program recorded on the recording medium may be read into a computer system and executed for the realization. A term "computer system" as used herein includes an OS or hardware such as peripheral devices. The "computer-readable recording medium" refers to a storage device such as a flexible disk, a magneto-optical disc, a portable medium such as a ROM or a CD-ROM, or a hard disk embedded in the computer system. The "computer-readable recording medium" may include a recording medium that dynamically holds a program for a short period of time, like a communication line when a program is transmitted via a network such as the Internet or a communication line such as a telephone line, and a recording medium that holds a program for a certain period of time, like a volatile memory inside the computer system that serves as a server or a client in this case. The program described above may also be a program for realizing a part of the functions described above. The program described above may be a program that can realize the functions described above in combination with a program already recorded in the computer system. The program described above may be a program realized by using a programmable logic device such as an FPGA.

Although the embodiment of the present invention has been described in detail with reference to the drawings, a specific configuration is not limited to this embodiment, and includes designs and the like within a range not deviating from the gist of the present invention.

INDUSTRIAL APPLICABILITY

An information display system and an information display method that an information displays such that information shared by a plurality of persons and personal information can be distinguished among the information provided in a space where a plurality of persons gather, and that improves acquisition and operability for both the plurality of persons and individuals are possible to provide.

REFERENCE SIGNS LIST

11 Floor surface
12 Wall surface
15 Camera
20 Control device
25 Communication unit
26 Display unit
60 (60-1, 60-2, and 60-3) Content-display-frame
70 Operation input area

The invention claimed is:

1. An information display system comprising:
    a position recognition unit configured to recognize a position of a user;
    a display unit configured to display a content-display-frame on a floor surface corresponding to the recognized position of the user;
    a determination unit configured to determine whether the position of the user is within a predetermined range from a wall surface or not; and
    a display control unit configured to display the content-display-frame so as to span from the floor surface corresponding to the recognized position of the user to the wall surface when the position of the user is within the predetermined range from the wall surface based on a result of determination by the determination unit, and to display an operation input area that receives an operation input from the user when touched by the user, wherein the operation input area is displayed on the wall surface within the content-display-frame, the content-display-frame so spanned making it possible to distinguish the operation input area associated with the user from other information associated with another user outside the content-display-frame.

2. The information display system according to claim 1, the information display system further comprising an operation detection unit configured to detect an operation of the user based on the operation input received from the user, wherein the display control unit is configured to change a display mode of the content-display-frame in accordance with the operation of the user and to display the mode.

3. The information display system according to claim 2, wherein, when a plurality of users is detected, the display control unit is configured to cause the display unit to display individual areas for displaying content-display-frames assigned to the plurality of users as one shared area for the plurality of users who performed an operation representing sharing based on a result of detection in which each operation of the plurality of users is detected.

4. The information display system according to claim 1, wherein the display control unit is configured to cause the display unit to display a content-display-frame including a machine reading code on the wall surface, the information display system further comprising a communication unit that, if a machine reading code transmitted from a terminal device that has read the machine reading code is received, is configured to transmit information regarding the content-display-frame including the machine reading code to the terminal device.

5. The information display system according to claim 1, wherein the display control unit is configured to cause the display unit to display a content-display-frame assigned to the user and a content-display-frame displaying common information for a plurality of users in different display areas on the wall surface.

6. An information display method comprising:
    recognizing a position of a user;
    displaying a content-display-frame on a floor surface and corresponding to the recognized position of the user;
    determining whether the position of the user is within a predetermined range from a wall surface or not; and
    displaying the content-display-frame so as to span from the floor corresponding to the recognized position of the user to the wall surface when the position of the user is within the predetermined range from the wall surface based on a result of determination by the determination unit, and displaying an operation input area that receives an operation input from the user when touched by the user, wherein the operation input area is displayed on the wall surface within the content-display-frame, the content-display-frame so spanned makin it possible to distinguish the operation input area associated with the user from other information associated with another user outside the content-display-frame.

* * * * *